DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED SEPTEMBER 7, 1976

950 O.G. 6

T950,008

MODIFYING ARAMIDS

Winfred E. Weldy, Wilmington, Del., assignor to Hercules Incorporated, Wilmington, Del.

Continuation of abandoned application Ser. No. 550,410, Feb. 18, 1975. This application Dec. 19, 1975, Ser. No. 642,223

Int. Cl.[2] B32B, *5/28;* D06M *13/38*

U.S. Cl. 428—395

No Drawing. 21 Pages Specification

It has been found that the adhesion of aramid polymers (such as described in U.S. Pats. Nos. 3,652,510; 3,699,-085; 3,673,143; etc.) can be greatly improved by modifying their surface with certain azidoformate compounds. The modification reaction can be initiated either thermally or by irradiation. The azidoformate compounds which can be so used are the hydroxyalkylphthalate azidoformates having the formula

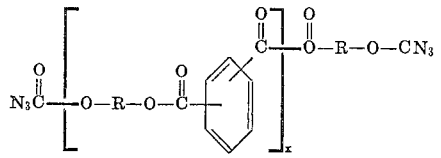

where R is a straight or branched chain alkylene radical containing 2 to 10 carbon atoms and $x$ is 1 to 10, and epoxy-azidoformate compounds having the formula

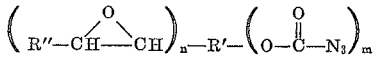

where R′ is a polyvalent organic radical, R″ is a hydrogen, alkyl, cycloalkyl, aryl, or aralkyl radical, and $n$ and $m$ are integers from 1 to 10. Typical uses of the modified aramid polymers are in reinforcing rubber tires, rubber belting and rubber hose with modified fibrous aramid material.